Jan. 2, 1923. Re. 15,514

D. F. CURTIN.

SUNDAE DISH AND HOLDER AND METHOD OF ASSEMBLING THE SAME.

ORIGINAL FILED OCT. 1, 1918.

Witnesses

D. Lloyd Ingram

Charles W. Hills

Inventor

David F. Curtin by Charles W. Hills Atty

Reissued Jan. 2, 1923. Re. 15,514

UNITED STATES PATENT OFFICE.

DAVID F. CURTIN, OF CHICAGO, ILLINOIS, ASSIGNOR, BY MESNE ASSIGNMENTS, TO THE VORTEX MFG. CO., OF CHICAGO, ILLINOIS, A CORPORATION OF ILLINOIS.

SUNDAE DISH AND HOLDER AND METHOD OF ASSEMBLING THE SAME.

Original No. 1,280,416, dated October 1, 1918, Serial No. 842,671, filed June 3, 1914. Application for reissue filed April 28, 1920. Serial No. 377,384.

*To all whom it may concern:*

Be it known that I, DAVID F. CURTIN, a citizen of the United States, and a resident of Chicago, in the county of Cook and State of Illinois, have invented a new and useful Improvement in Sundae Dishes and Holders and Methods of Assembling the Same, of which the following is a specification.

My invention relates to soda cups and the like and holders therefor, and has for its object to provide a folded paper cup and a holder to support the cup of conical shape having an inwardly offset lip or tongue for engaging a lip or tongue on the paper cup to hold the latter in place.

On the drawings—

The present embodiment of the invention comprises a holder or body 1 of frusto-conical shape and arranged with its small end downward, and the large end of the holder proper is beaded as shown at 2. The lower small end of the holder proper is continuous with a column or standard 3 of tubular form, and the lower end of the standard is connected to a circular base 4.

In the present instance, the base is grooved on its under face near its periphery to form an annular rib 5 on the upper face for the purpose of reinforcing and strengthening the base. The body 1 of the holder is shaped to fit a cone having a lateral area three-fourths of the area of the circle the radius of which is the slant length of the cone. That is, the holder is shaped to fit and receive conical cups made from blanks of circular shape by forming one-fourth of the area of the blank into a tongue or lip.

Figure 4:
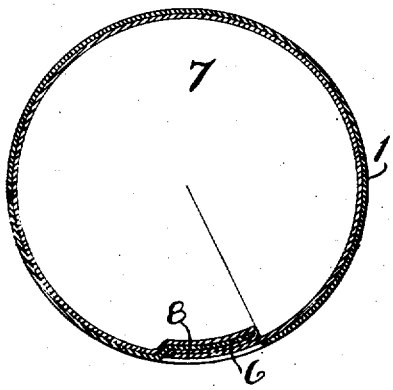
Figure 4 is a section on the line 4—4 of Figure 2.

The body of the holder is provided with an inwardly offset tongue 6, the tongue in the present instance being formed by slitting the material of the body on lines parallel and spaced apart from each other and connected at one end, the material between the lines being offset inwardly as shown more particularly in Figure 4.

The paper cups are formed from disks of paper creased on two lines extending from the center to the periphery at an angle of 45° with respect to each other.

The blank 7 is bent in opposite directions on these lines, and that portion of the blank between the two lines is folded onto the outer surface of the blank to form a tongue, lap or lip 8, the said tongue or lip extending from the center to the periphery of the paper cup and unconnected to the body of the cup except along its line of fold.

Figure 2:
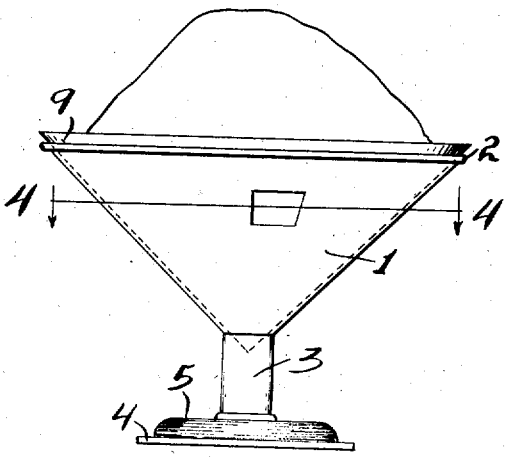
Figure 2 is a front view of the holder with the paper cup in place.
Figure 3:
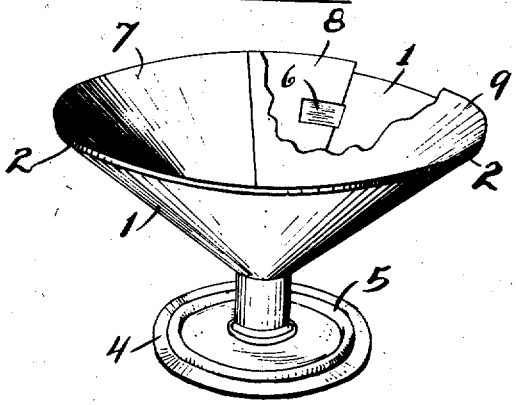
Figure 3 is a perspective view of the same with parts in section.

The tongue or lip 8 of the paper cup is engaged beneath the tongue or lip 6 of the holder to hold the paper cup in place, the paper cup being formed into a cup by the bend above mentioned. The paper cup is of such size that when in place in the cup a portion of the paper cup will extend beyond the bead 2 of the holder, as indicated at 9 in Figures 2 and 3 to protect the edge of the holder proper.

The apex of the cup formed by folding the blank is received in the hollow stand or column 3 of the holder. In practice the blanks folded as above mentioned in cup shape are arranged within a container comprising an approximately cylindrical body 10, having its upper edge beaded as shown at 11, and provided with an opening 12, extending from the top to the bottom of the body.

Figure 1:
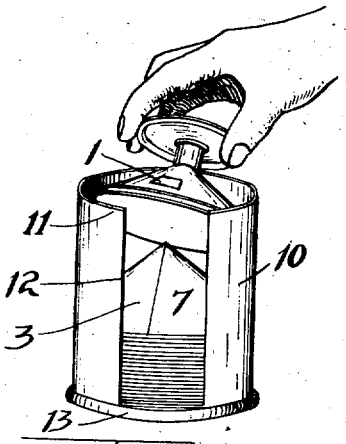
Figure 1 is a perspective view of the holder and a container for the paper cups, showing the manner of picking up the paper cups from the container by the holder.

A bottom 13 is provided for the container, and the cups 7 formed by folding the blanks are nested, and are then placed in the container in inverted position as shown in Figure 1.

When it is desired to use one of the cups formed by the folding of the blanks, the holder is grasped by the base as shown in Figure 1 and placed in position over the upper-most blank. The holder is then partially rotated to cause the tongue or lip 6 to enter beneath the tongue or lip 8 of the paper cup and the cup may then be lifted out of the container in proper position in the holder.

After using the cup may be easily dislodged from the holder by giving it a partial rotation to release the tongue 8 from the tongue 6 of the holder. The paper cup may be of any desired size and it is obvious that it is not essential to fold one-fourth of the area into the tongue. It is only essential to fold enough of the blank to form a tongue of some character.

The folding of one-fourth of the blank makes a good sized cup, having about the proper capacity and holding the contents in easily accessible position. By folding less of the blank into the tongue, a shallower cup is obtained while by folding more a deeper cup will result.

Should the cup stick in the holder through adherence between the outer surface of the cup and the inner surface of the holder, it may be easily dislodged through the tubular column for the said column opens through the base.

I claim as my invention:

1. A holder for folded paper cups of conical shape comprising a frusto-conical body arranged with its small end downward and open, a base of circular form and a tubular column connecting the small end of the body with the base, said base having an opening at the column, and the body having a portion of the wall thereof partially separated and offset inwardly to form a tongue for engaging the fold of the cup.

2. A holder for folded paper cups of conical shape comprising a frusto-conical body arranged with its small end downward and open, and a base connected to the small end of the body, a portion of the wall of the body being partially separated and offset inwardly to form a tongue for engaging the fold of the blank.

3. A holder for folded paper cups of conical form comprising a body formed to fit the exterior of said cup and having an aperture in its side intermediate its height, a base rigidly connected to the small end of said body and a tongue attached to said body and projecting over said aperture for engaging a fold of said cup to hold the cup in contact with said body and permit the extent of said engagement to be seen from the exterior of said body.

4. A holder for paper cups of conical form comprising a body part formed to fit the exterior of said cup, having an aperture in its side intermediate its height, and a base rigidly connected to the small end of said body part by a tubular standard rigidly connected to said base and body part rigidly secured thereto and projecting over said aperture for engaging a fold of said cup to hold the cup in contact with the body and permit the extent of said engagement to be seen from the exterior of said holder.

5. A holder for folded paper cups of conical form, comprising a body formed to fit the exterior of said cup, a base connected to the small end of said body, and a tongue attached to said body intermediate its height, and extending circumferentially of the body, and adapted to engage a fold of the cup to hold the cup in contact with the body and to permit the cup to be received in the container without the necessity of touching said cup.

6. A device of the class described, comprising in combination a conical cup, a holder therefor comprising a body formed to fit the exterior of said cup, and means on said cup and body intermediate their height adapted to interengage by rotation to hold the two in engagement.

7. A device of the class described, comprising a conical cup, and a holder therefor comprising a body formed to fit the exterior of said cup, a base connected to the small end of said body, and a tongue attached to said body intermediate its height, extending circumferentially of the body and adapted to engage a fold of the cup to hold the two in engagement.

8. A device of the class described, comprising a conical cup, and a holder therefor comprising a body formed to fit the exterior of said cup, a flap on said cup, and a tongue attached to the body of the holder adapted to engage said flap laterally to hold the two in engagement.

9. The method of applying sanitary cups to holders, which consists in assembling a plurality of nested cups, and then applying to the exposed cup a holder in such manner as to cause the two to interlock.

10. The method of applying sanitary cups to holders, which consists in assembling a plurality of cups nested and inverted, and then applying to the uppermost of said cups an inverted holder in such manner as to cause the two to interlock.

11. The method of applying sanitary cups to holders, which consists in assembling a plurality of nested cups, then applying to the exposed cup a holder, and then rotating said holder, thereby causing it to engage and lock with said cup.

12. The method of applying sanitary cups to holders, which consists in assembling a plurality of cups nested and inverted, then applying to the uppermost of said cups an inverted holder, and then rotating said holder, thereby causing it to engage and lock with said cup.

In testimony whereof I have hereunto subscribed my name in the presence of two subscribing witnesses.

DAVID F. CURTIN.

Witnesses:

CHARLES W. HILLS, Jr.,
EARL M. HARDINE.